Figure 1:
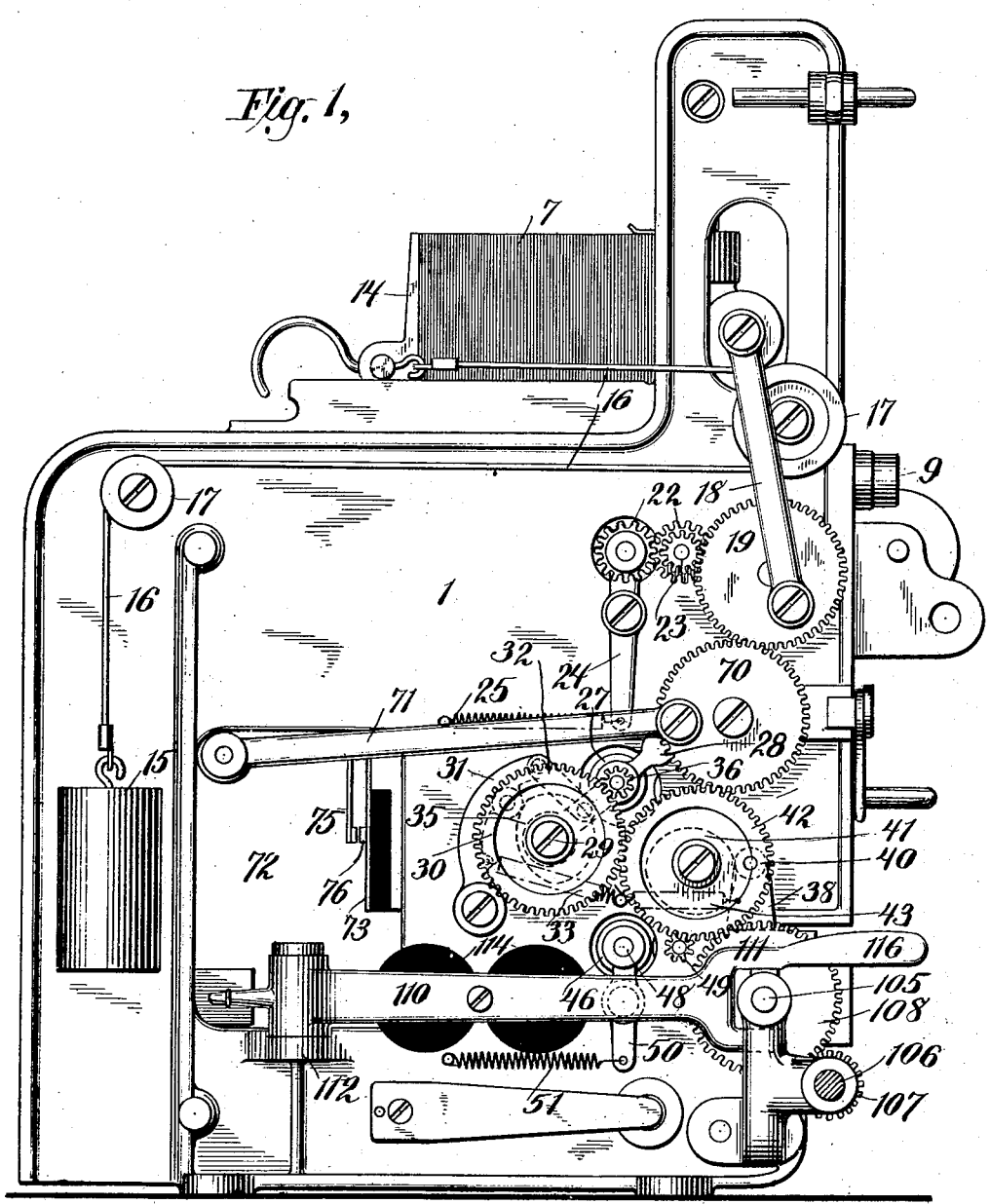

No. 685,608.  
H. HOLLERITH.  
TABULATING APPARATUS.  
(Application filed Mar. 13, 1901.)

(No Model.)

Patented Oct. 29, 1901.

12 Sheets—Sheet 2.

WITNESSES:  
D. H. Hayward  
Laughlin McLean

INVENTOR  
Herman Hollerith  
BY  
Murphy & Metcalf  
ATTORNEYS

No. 685,608. Patented Oct. 29, 1901.
H. HOLLERITH.
TABULATING APPARATUS.
(Application filed Mar. 13, 1901.)
(No Model.) 12 Sheets—Sheet 3.
Fig. 3,
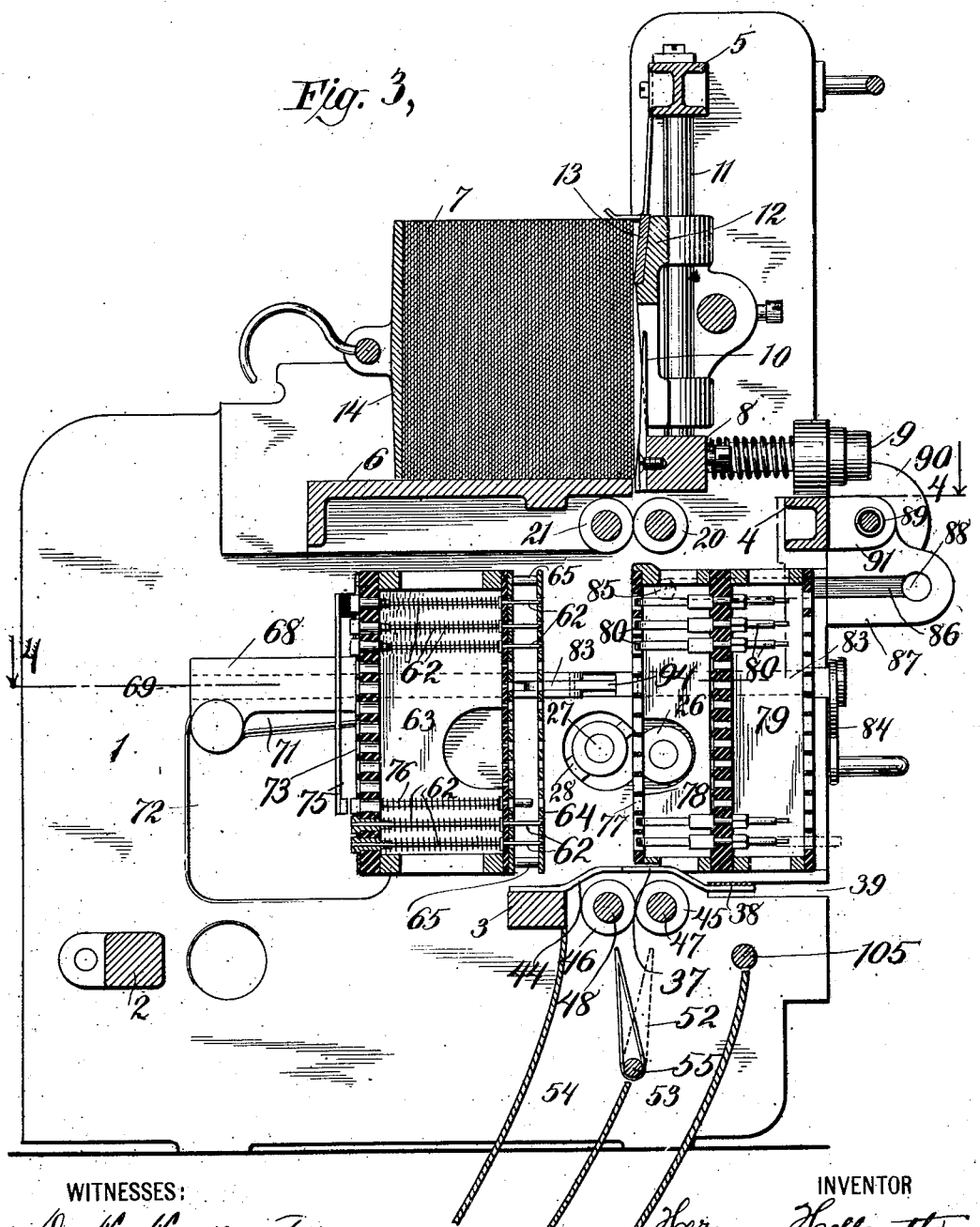
WITNESSES:
D. N. Hayward
Lauchlin McLean
INVENTOR
Herman Hollerith
BY
Murphy & Metcalf
ATTORNEYS

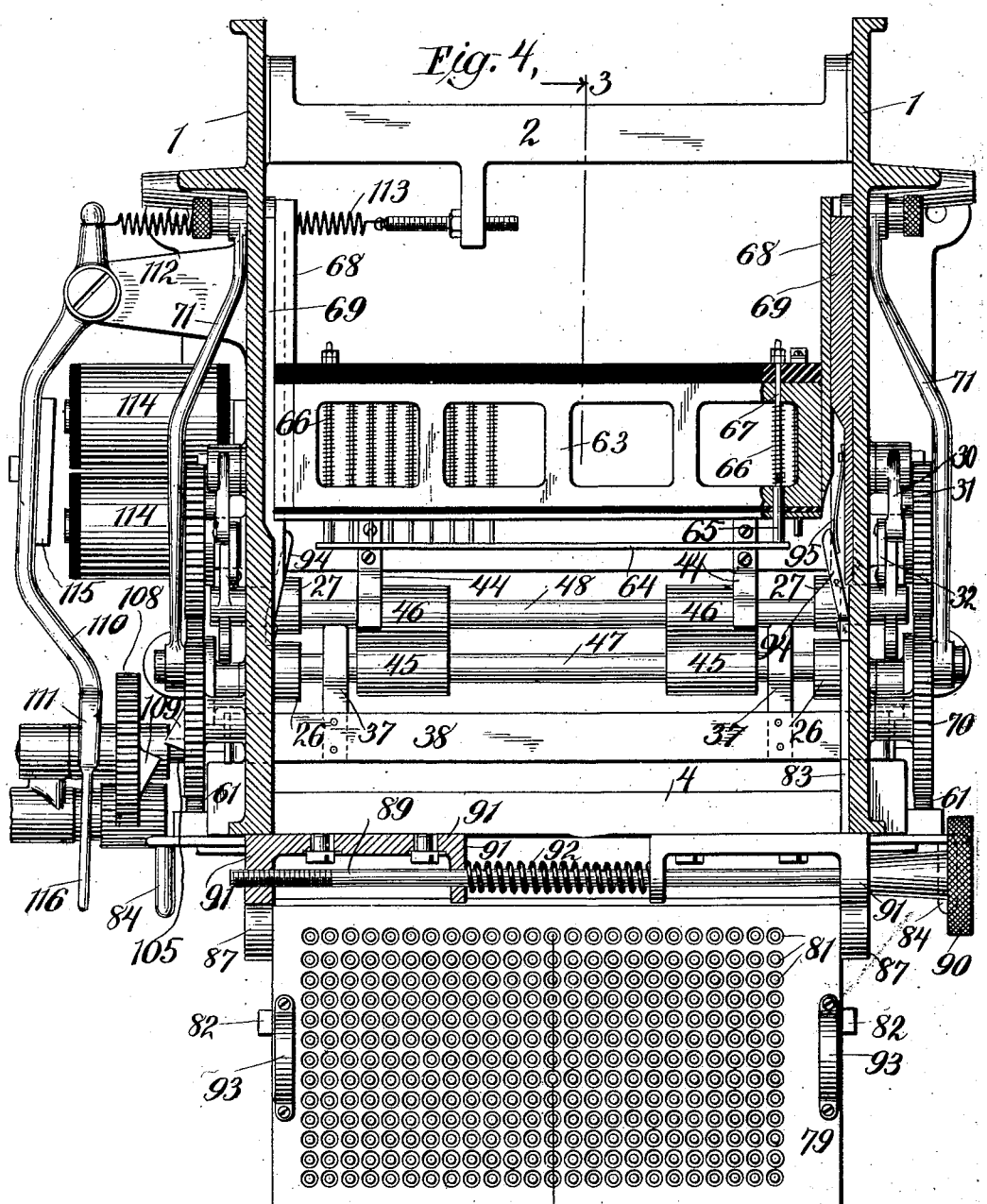

No. 685,608. Patented Oct. 29, 1901.
H. HOLLERITH.
TABULATING APPARATUS.
(Application filed Mar. 13, 1901.)
(No Model.) 12 Sheets—Sheet 5.
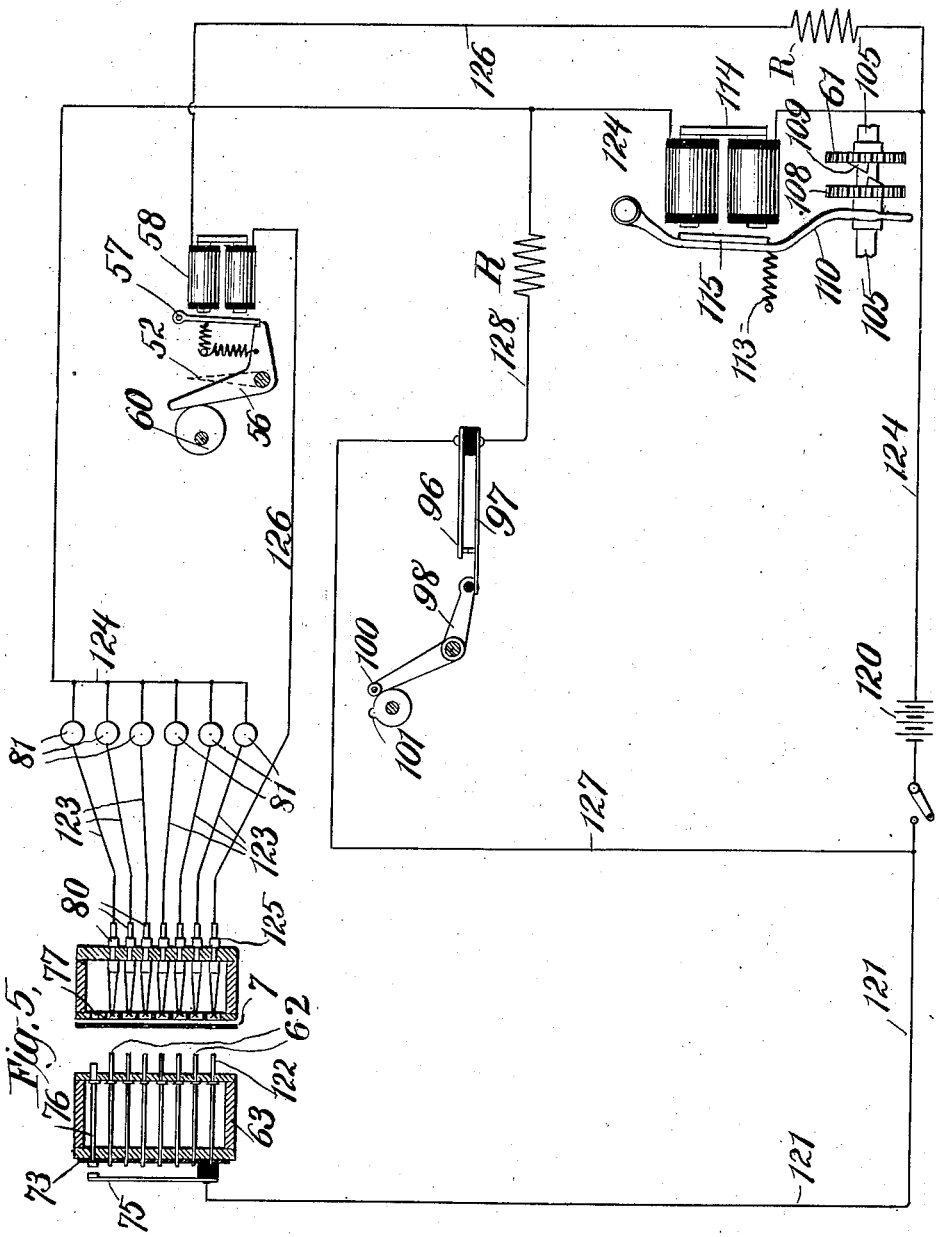
WITNESSES:
INVENTOR
Herman Hollerith
BY
ATTORNEYS No. 685,608. Patented Oct. 29, 1901.
H. HOLLERITH.
TABULATING APPARATUS.
(Application filed Mar. 13, 1901.)
(No Model.) 12 Sheets—Sheet 6.
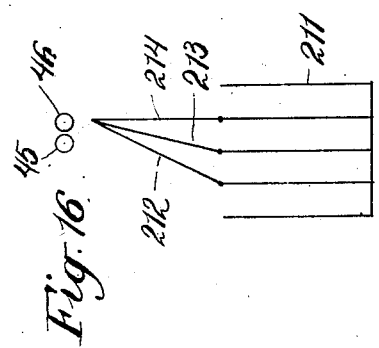
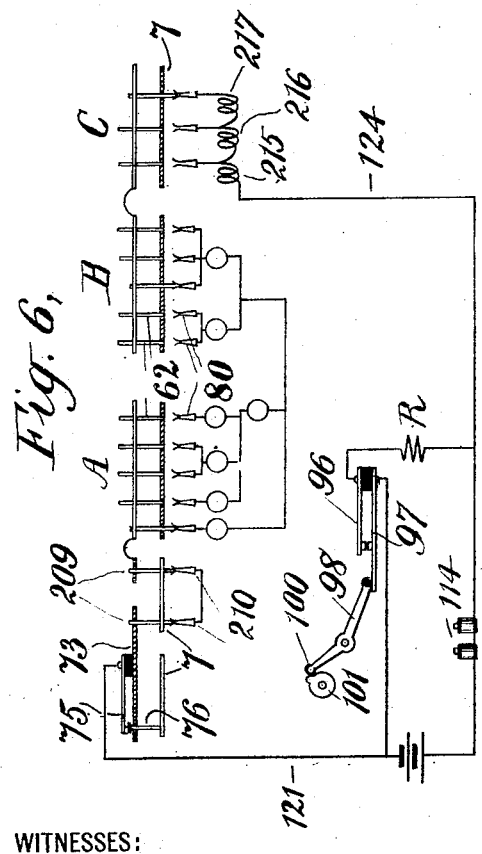
WITNESSES:
D. N. Hayman
Lauchlin McLean
INVENTOR
Herman Hollerith
BY
Murphey & Metcalf
ATTORNEYS No. 685,608. Patented Oct. 29, 1901.
H. HOLLERITH.
TABULATING APPARATUS.
(Application filed Mar. 13, 1901.)
(No Model.) 12 Sheets—Sheet 7.

No. 685,608. Patented Oct. 29, 1901.
H. HOLLERITH.
TABULATING APPARATUS.
(Application filed Mar. 13, 1901.)
(No Model.) 12 Sheets—Sheet 8.
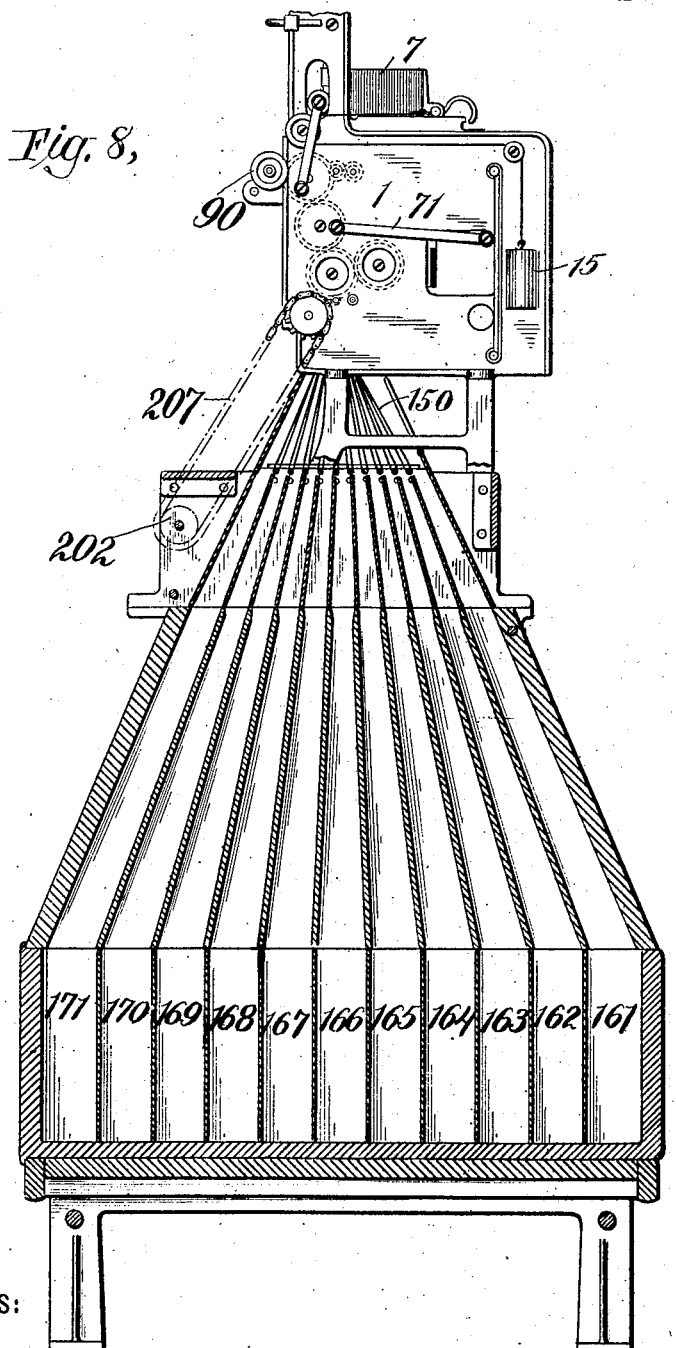

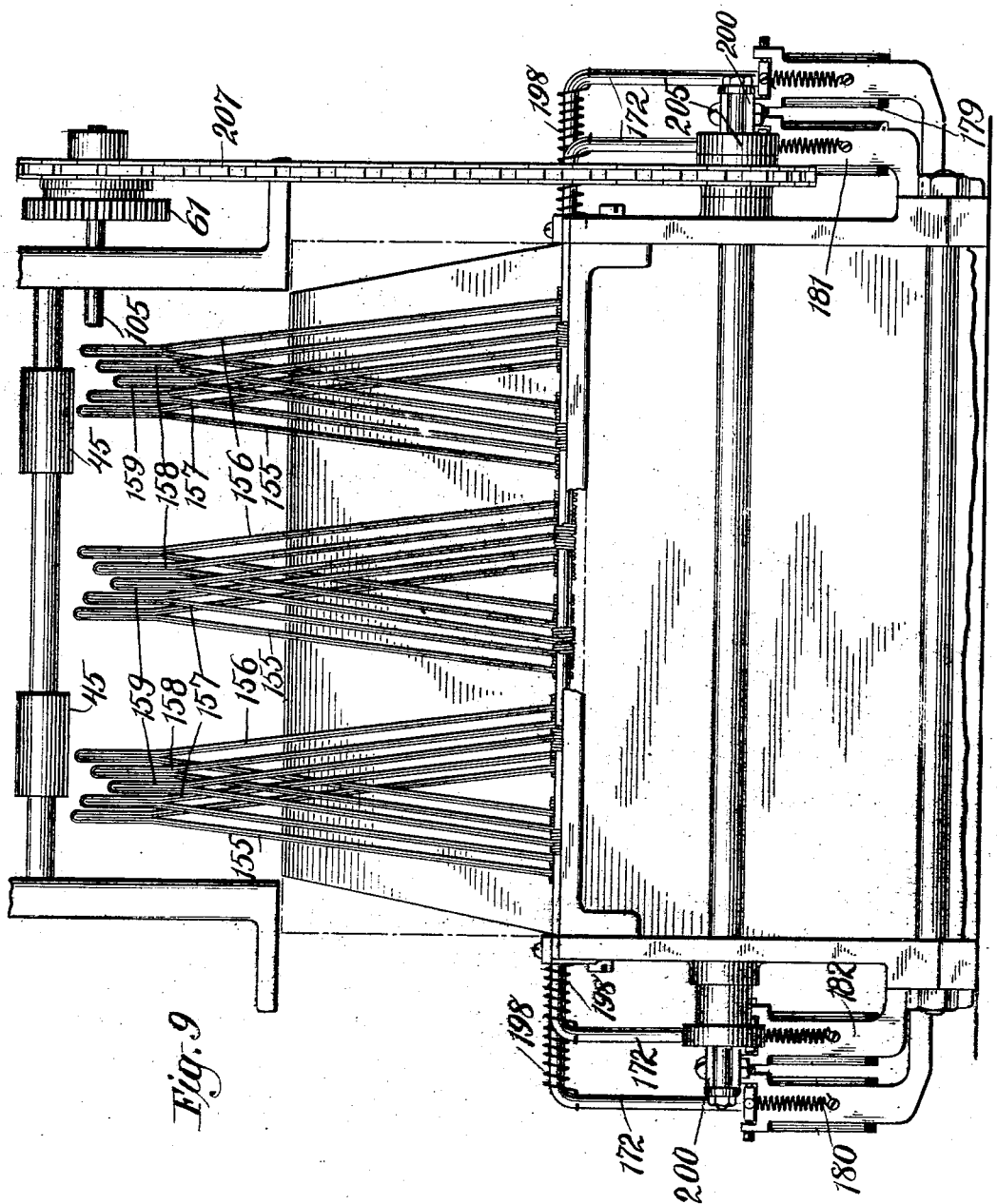

No. 685,608. Patented Oct. 29, 1901.
H. HOLLERITH.
TABULATING APPARATUS.
(Application filed Mar. 13, 1901.)
(No Model.) 12 Sheets—Sheet 10.
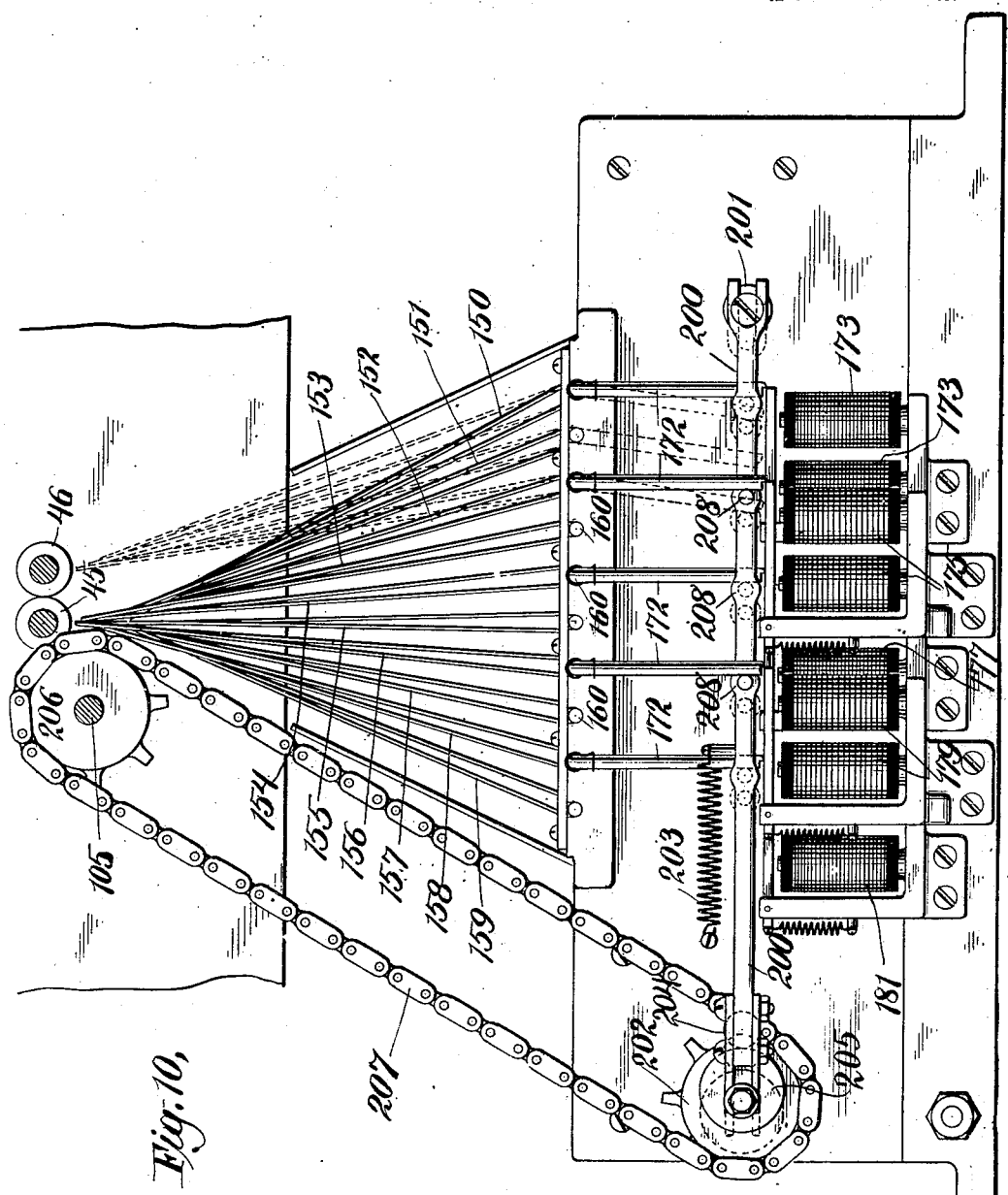
WITNESSES: INVENTOR
Herman Hollerith
BY
ATTORNEYS No. 685,608. Patented Oct. 29, 1901.
H. HOLLERITH.
TABULATING APPARATUS.

(No Model.) 12 Sheets—Sheet 11.

WITNESSES:
D. H. Hayward
Lauchlin McLean

INVENTOR
Herman Hollerith
BY
Murphy & Metcalf
ATTORNEYS

No. 685,608. Patented Oct. 29, 1901.
H. HOLLERITH.
TABULATING APPARATUS.
(No Model.) 12 Sheets—Sheet 12.

WITNESSES:
D. N. Naylor
Lauchlin McLean

INVENTOR
Herman Hollerith
BY
Murphey & Metcalf
ATTORNEYS

UNITED STATES PATENT OFFICE.

HERMAN HOLLERITH, OF WASHINGTON, DISTRICT OF COLUMBIA.

TABULATING APPARATUS.

SPECIFICATION forming part of Letters Patent No. 685,608, dated October 29, 1901.

Application filed March 13, 1901. Serial No. 50,975. (No model.)

*To all whom it may concern:*

Be it known that I, HERMAN HOLLERITH, a citizen of the United States, and a resident of Washington, District of Columbia, have invented certain new and useful Improvements in Tabulating Apparatus, of which the following is a full, clear, and exact description, reference being had to the accompanying drawings, forming part of this specification.

My invention relates to improvements in means and apparatus for compiling or tabulating data—such, for example, as statistical items which have been designated in or upon a suitable record.

The records consist, preferably, of separate cards in which holes have been punched, the location of each hole in the card determining the value or character of the item thus recorded. Each of these cards (whether separate or not) constitutes one record, and the items of each record are by the instrumentality of the record itself recorded upon suitable counters or registers forming part of the compiling apparatus. Stated in general terms, the principal objects of my invention are to provide means for accurately and rapidly presenting each record successively to the action of the compiling devices and to provide means whereby the records may be properly classified or sorted.

The preferred form of apparatus which I have selected for the purpose of detailed description and illustration is designed and arranged for electrical operation in connection with records which have been punched on separate cards; but it is not essential to my invention that the cards themselves should be actually separated from each other, so long as the records are presented successively to the action of the apparatus, and it will further be apparent that electrical operation is not necessary as to many features of my invention.

In the apparatus illustrated the cards, having been punched, are arranged in proper position upon a suitable feeding-platform and are thence fed one by one into their operative position, in which they control the operation of the selecting devices. The particular form of selecting devices shown consists of a series of spring-pressed conductive pins arranged to coöperate with a corresponding number of electrically-connected spring-jacks. Each card is momentarily supported in its operative position and is then carried from such position and, if desired, deposited in or upon a predetermined receiver or compartment. In the simplest form of apparatus I have described two of these receivers, but have also illustrated and described a larger number, in any one of which the card will be finally deposited according to the character of the record on the card.

Any desired number of the record-cards, within the limits of the capacity of the feeding-platform, may be placed in the machine at the beginning of its operation, and after the cards are placed in position and the apparatus started the subsequent operations, including the feeding of the cards, the compilation or tabulation of the data thereon, and the removal and sorting of the cards, are all entirely automatic and are all controlled by the records themselves.

Having thus generally indicated the principle of operation of this particular embodiment of my invention, I will now describe the accompanying drawings, in which—

Figure 2:
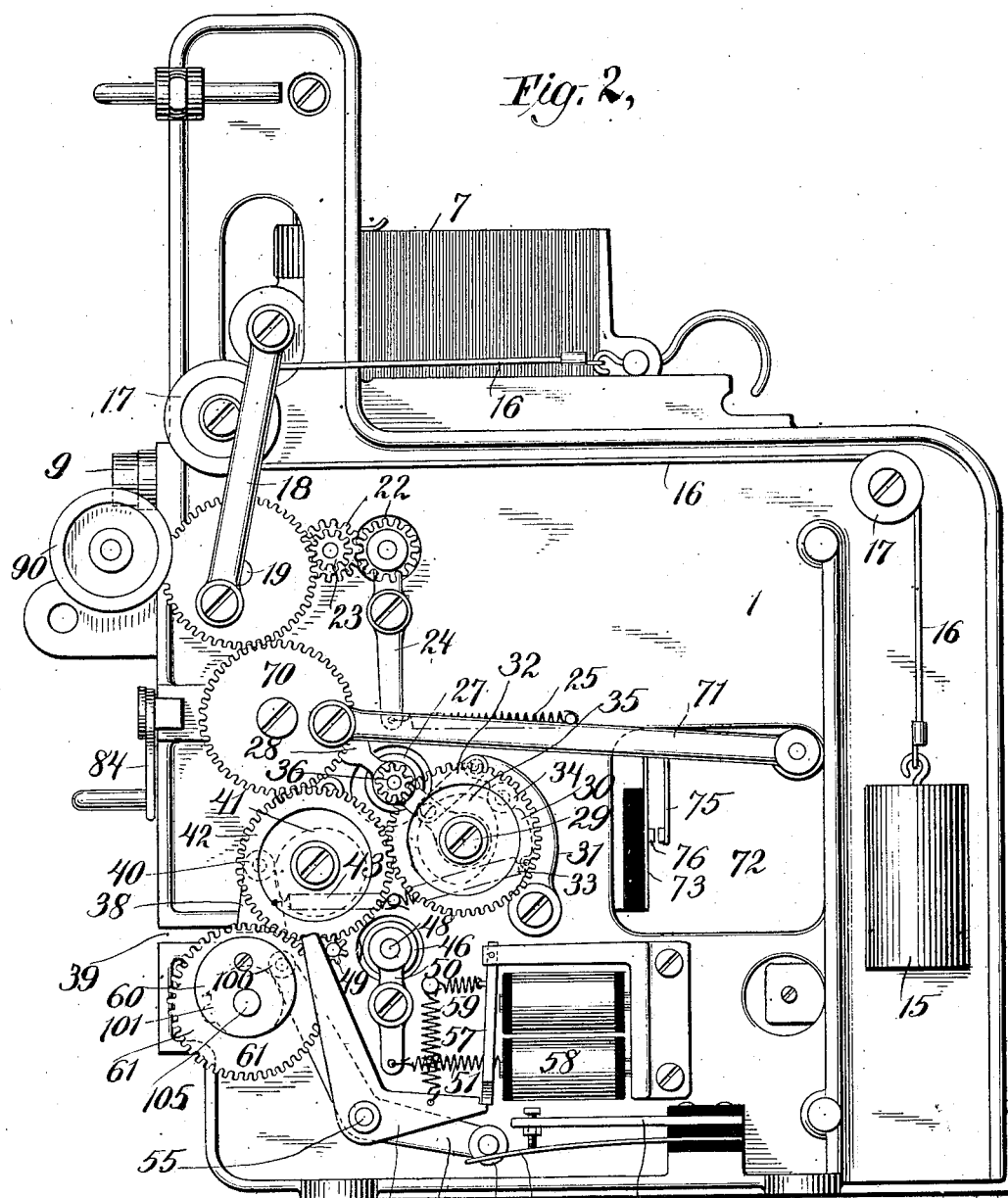
Figure 7:
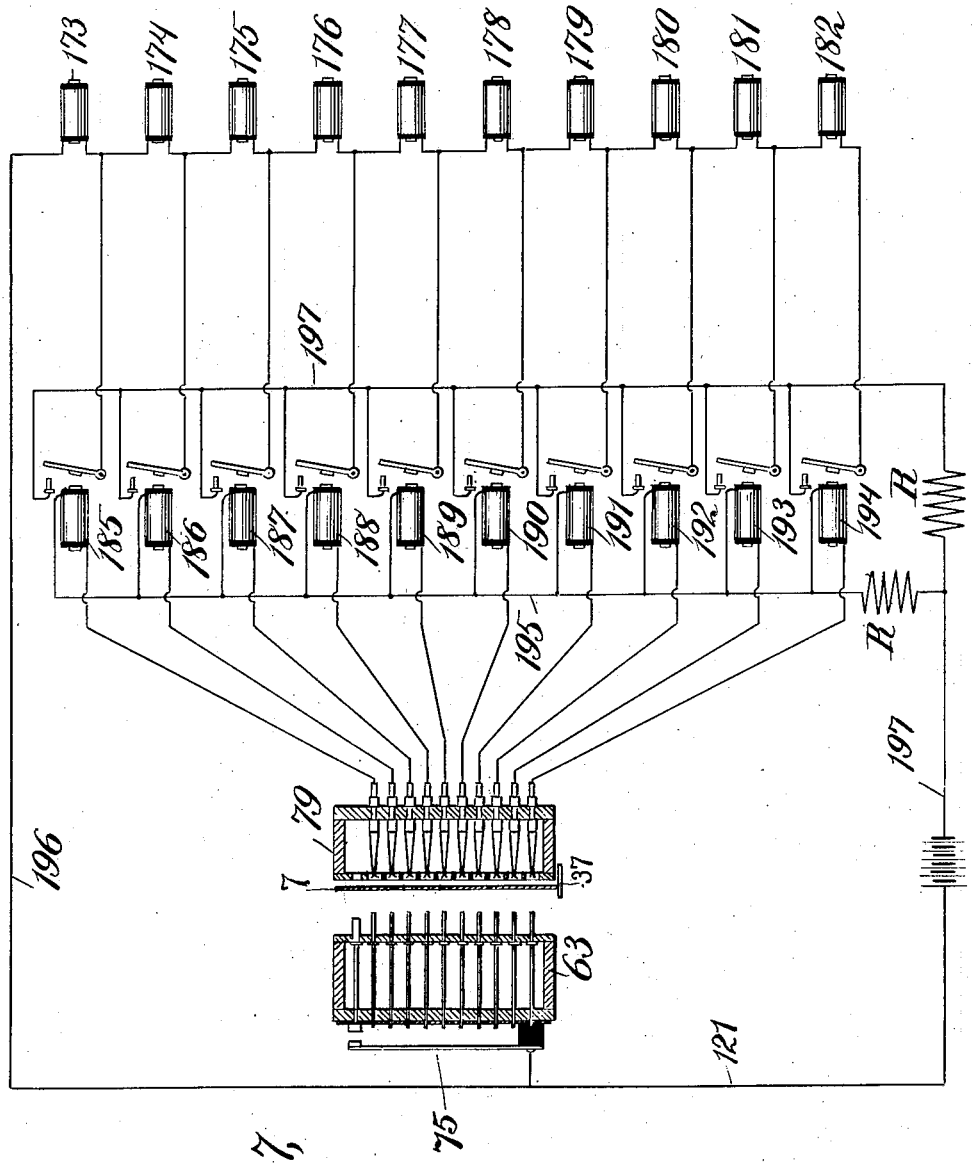
Figure 12:
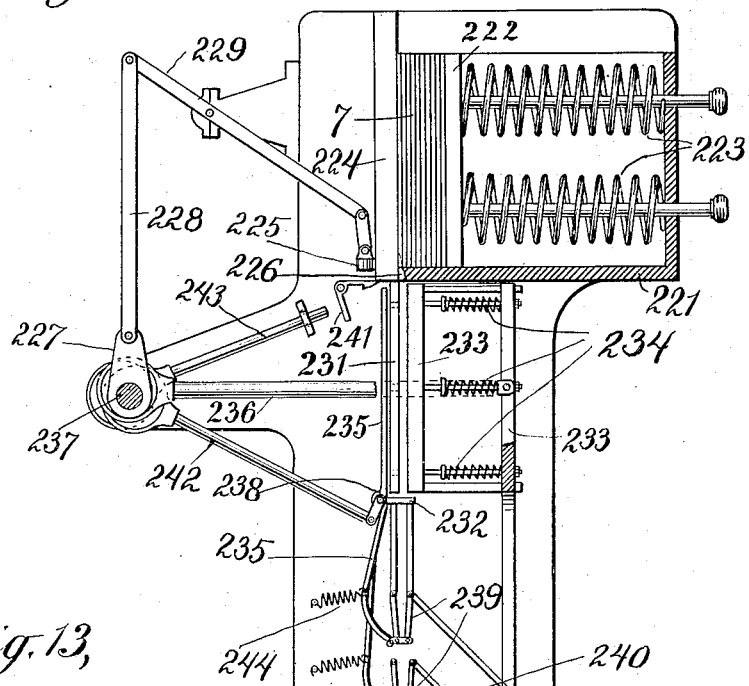
Figure 13:
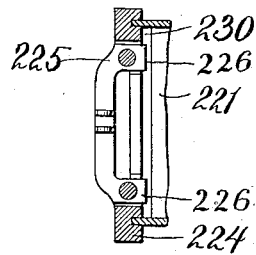
Figure 14:
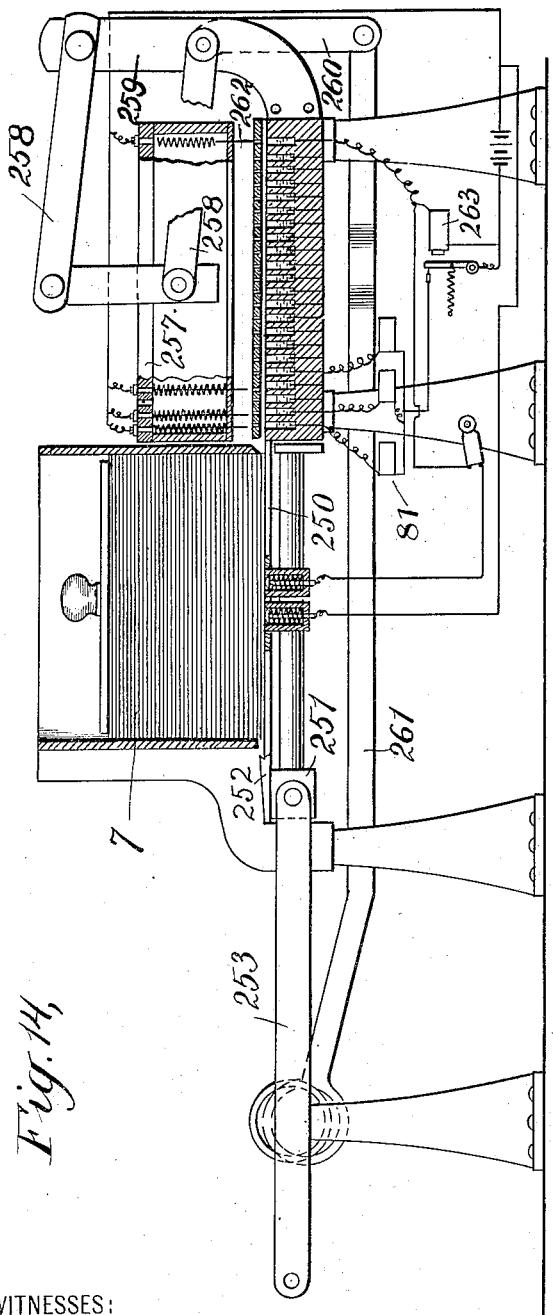
Figure 15:
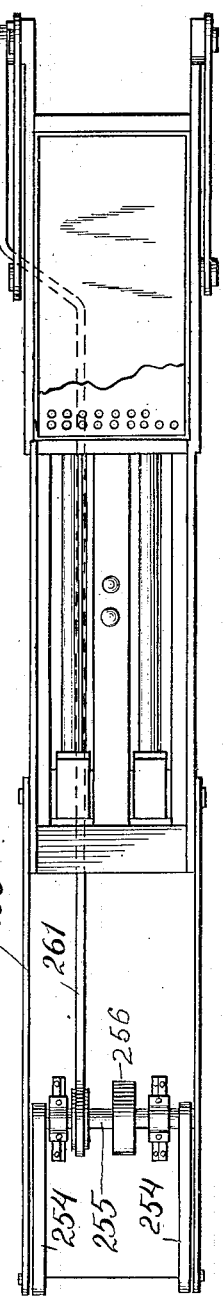

Figure 1 is a side elevation of a machine designed for carrying out my invention. Fig. 2 is an elevation of the opposite side of the machine. Fig. 3 is a vertical section on the line 3 3, Fig. 4. Fig. 4 is a horizontal section on the line 4 4, Fig. 3. Fig. 5 is a diagrammatic view showing the electrical circuits and connections. Fig. 6 is a diagrammatic view showing a method of connecting the counters and their operating circuits and connections. Fig. 7 is a diagrammatic view of the circuits and connections by which a modified form of sorting mechanism is operated. Fig. 8 is a side elevation showing the machine and sorting mechanism and compartments. Fig. 9 is an end elevation. Fig. 10 is a side elevation of the sorting devices. Fig. 11 is a plan view of a record-card. Fig. 12 is a vertical section showing a modified form of feeding and sorting apparatus. Fig. 13 is a detail showing the feeding cross-head. Fig. 14 is a vertical section showing a modified form of feeding and compiling mechanism and circuits. Fig. 15 is a partial plan view thereof, and Fig. 16 is a diagrammatic view showing the sorting devices.

Similar reference characters indicate corresponding parts in all the views.

Referring to the form of apparatus shown in Figs. 1 to 6, the side frames 1 of the machine are connected by the cross-bars 2, 3, 4, and 5 and by the platform 6, which forms a support for the record-cards 7. An adjustable gage-bar 8 extends across the frame of the machine behind the platform 6 and is adjustably carried by the screws 9, by which the distance between the edge of the platform 6 and the bar 8 may be accurately adjusted, so as to leave between them a feeding-slot of the desired width to accommodate varying thicknesses of cards. A series of slats 10 are secured to the gage-bar 8 and serve to support the card and prevent its buckling. Upon the guides 11, which are carried by the cross-bars 5 and the gage-bar 8, is mounted a vertically-reciprocating cross-head 12, upon which is carried a plate 13, which projects beyond the face of the cross-head a distance slightly less than the thickness of a card. A follower-plate 14 is held against the cards by the weights 15, which are secured to the plate by the cords 16, passing over sheaves 17. The follower-plate 14 exerts a constant pressure against the cards and holds them firmly against the gage-bar 8 and the fingers 10, so that when the cross-head 12, having been lifted to the highest point, descends the plate 13 will engage the top edge of the first card and carry it down through the opening in front of the gage-bar 8. The cross-head is actuated by means of connecting-rods 18, connected to the cross-head and to the spur-gears 19. Motion is imparted to the latter in a manner to be presently described. The feed-rolls 20 21 extend across the machine, just below the feeding-slot, between the gage-bar 8 and the platform 6. The rolls are provided with intermeshing gears 22, and pinions 23 on the roll 20 mesh with the gears 19, by which the rolls are driven. The roll 20 is journaled in the side frames of the machine, and the roll 21 is mounted on the ends of the pivoted arms 24, to the opposite ends of which are secured the springs 25, which hold the roll 21 in yielding contact with the roll 20, thus allowing for any variation in the thickness of the record-cards. On each side of the machine, below the feeding-rolls, are mounted two stud-rolls 26 27, which are driven at a higher speed than the feed-rolls and which I therefore term "accelerator-rolls." The rolls 26 are journaled in the side plates of the machine; but the rolls 27 are each mounted in a rock-arm 28, carried by the shaft 29, upon which the spur-gears 30 are mounted. The rock-arms 28 are secured to the pivoted arms 31 by the links 32, and springs 33 are secured at one end to said arms and at the other end to the side frames of the machine. Antifriction-rollers 34, carried by the arms 31, are engaged by cams 35 on the shaft 29. The rotation of the shaft 29 will thus rock the arms 28, so as to carry the rolls 27 toward and away from the rolls 26 at each revolution of the shaft 29, the parts being so proportioned and arranged that during the feeding of a card into operative position and during the time that the mechanism is under the control of the card the rolls 27 will be held away from the card; but when such control is completed the rolls 27, which are positively driven at all times by the pinions 36, in mesh with the gears 30, will be carried into engagement with the edges of the card and will feed it down into the ejector-rolls, to be presently described.

Each card is supported in position to control the operation of the circuit-closing devices (the pins and jacks above referred to) by fingers 37, carried by the reciprocating bar 38, which are moved into position under the card before the latter reaches its operative position and which are moved out from under the card as soon as the action of the circuit-closing devices is completed. The bar 38 projects through slots 39 in each side plate of the machine. The ends of the bar 38 are carried upwardly and at their extremities carry studs or rollers 40, which are engaged by cams 41 on the spur-gears 42. Springs 43 hold the rollers 40 in engagement with the cams 41, so that the bar 38 and fingers 37 will be moved back and forth at each revolution of the gears 42. Stationary fingers 44, secured to the cross-bar 3, project toward the fingers 37, and when the latter have been advanced into their supporting position the two sets of fingers will extend completely across the path of the movement of the cards and prevent them from dropping below their operative position until the supporting-fingers 37 are withdrawn.

The ejector-rolls 45 and 46 are mounted on the shafts 47 and 48. The shaft 47 is journaled in the side plates of the machine, and secured to the shaft are the pinions 49, which mesh with the gears 42. The shaft 48 is journaled in the arms 50, pivoted to the side frames of the machine, and to the lower ends of the arms are secured the springs 51, whereby the rollers 46 are held toward the rollers 45 and exert a yielding pressure against the cards which are fed between them. The rolls 45 are positively driven, preferably at a higher rate of speed than the accelerator-rolls, by the pinions 49, and the rolls 46 are driven frictionally.

The sorting mechanism comprises a suitable number of receivers into which the records are delivered. For convenience of description I have used the term "sorting-compartments" in referring to these receivers, and I employ this term broadly and without any literal limitation, intending that it shall cover any suitable receptacle or device for receiving the cards, so as to preserve the classification or separation of the records effected by the machine. In the form of apparatus shown one or more guides or deflectors are employed, which are arranged and operated to deliver each card into one of two or more sorting-compartments. In the simplest form, Figs. 3 and 5, the deflector 52 is arranged to deliver the cards into either one of the two chutes or compartments 53 or 54. The deflector 52 is secured to the rock-shaft 55, upon one end of which, outside the frame, is secured a bell-crank 56, normally latched in the position shown in Fig. 2 by the armature 57 of an electromagnet 58. With the bell-crank in this position the deflector will be in the position shown in full lines in Fig. 3, and any card passing through the ejector-rolls will be delivered into the chute 53. If, however, a circuit be established through the coils of the magnet 58, the armature 57 will be attracted, releasing the bell-crank 56, the opposite arm of which under the action of spring 59 will be carried against the revolving cam 60, carried by the gear 61, which meshes with the gear 42. This will swing the deflector 52 into the position shown in dotted lines, Fig. 3, establishing communication between the ejector-rolls and the chute 54. The cam 60 is so adjusted that at the time of the completion of the circuit through the magnet 58 the minor radius of the cam will be toward the lever 56, and the revolution of the gear 61, which will bring the major radius of the cam under the arm of the lever 56, will carry said lever and the deflector back into their normal position, when the lever will be automatically relatched by the armature 57.

The sorting mechanism shown in Figs. 7 to 10 comprises means for establishing communication between the ejector-rolls and any one of eleven sorting-compartments; but it is in principle substantially the same as that just described, and I will therefore describe the other mechanical and electrical features of the apparatus before proceeding to a detailed description of such sorting mechanism, it being understood, of course, that as many different compartments may be employed as the character of the records being tabulated may render desirable.

The selecting or circuit-closing devices to which I have previously referred and which coöperate with the record to operate the compiling or sorting mechanism, and also, as shown, to control the operation of the machine itself, comprise a suitable number of spring-pressed conductive-pins 62, carried in a frame or pin-box 63. The pins project normally beyond the face of the pin-box, which carries a yielding pressure-plate 64, provided with apertures through which the ends of the pins may pass. The pressure-plate 64 is supported at its corners on guides 65, Fig. 4, which enter suitable apertures in the pin-box, and the plate is held away from the face of the pin-box by springs 66, carried by the posts 67, on which the guides 65 travel. Secured to each end of the pin-box 63 is a horizontally-extending arm 68. These arms are channeled to embrace the guides 69 on the side plates of the machine and are connected with the gears 70, which mesh with the gears 19 and 42, by the connecting-rods 71. Suitable openings 72 are formed in the side plates of the machine to permit the pin-box to be reciprocated when the gears 70 are rotated. The pins 62 in the particular system of electrical connection to be herein described are primarily all insulated electrically from each other; but they are arranged in groups in accordance with the data to be tabulated, and the pins of each group are connected by an electrical conductor common to all the pins of the group, as indicated in Fig. 5, in which the pins 62 are represented as belonging to one group having the common electrical conductor 73. The pins of the other groups are similarly connected with each other, the connections between the groups being more fully described hereinafter. A contact device controlled by the record is carried by the pin-box for establishing an electrical connection between the pins in one of the groups and the generator. This device comprises a conducting-tongue 75, connected with the circuit. A spring-pressed contact-pin 76 is carried by the pin-box in such position that when a record is properly positioned to coöperate with the selecting devices the pin will as the pin-box is reciprocating engage with the card, its forward movement will be arrested, and the continued movement of the pin-box will cause the pin 76, which is in contact with the conductor 73, to contact with the tongue 75. If, however, no card is in position in front of the pin-box, the pin 76 will enter a hole 77 in the plate 78 of the jack-box or frame 79 and will not contact with the tongue 75, and the circuit will remain open at this point.

The jack-box 79 carries a number of spring-jacks 80, one for each of the conductive pins in the pin-box. The jacks 80 are insulated from each other, and each one of them is connected by conducting-wires with the magnet-coils of an electromechanical registering device 81. In case the compilation consists in the classification and counting of units of varying character—as is the case, for instance, in tabulating certain statistics of population—the registering devices may consist of any form of ordinary electrically-operated unit-counting devices; but in case the work comprises the registering or addition of items of varying amounts, the registering devices shown and described in my pending application, Serial No. 24,019, may be employed instead of such counters. By the term "compiling" apparatus as herein used I intend to include these and other equivalent registering or counting devices.

The spring-jacks are so arranged that each time the pin-box is reciprocated (if no card be in position in front of the jacks) each of the conductive pins carried by the pin-box will contact with its corresponding jack; but if a card properly punched be in position those pins which are opposite the perforations will pass through the perforations and contact with the jacks, while those pins opposite the spaces on the card which have not been punched will be held back by the card and will not contact with the jacks. At each end of the jack-box is a projecting rib 82, which enters a groove 83, formed in the side frames of the machine. These serve to support the jack-box in position, and when in position it is firmly clamped in place by the latches 84, pivoted to the frame of the machine and which may be swung inwardly behind the jack-box. The jack-box is also provided on each end with a projecting stud 85, (shown in dotted lines in Fig. 3,) which enter grooves 86 in the side frames. These grooves are extended into the adjustable brackets 87 and terminate in the circular aperture 88. The brackets 87 are secured to the cross-bar 4 so as to permit a limited movement toward and from each other. A rod 89, provided with a suitable adjusting-head 90, passes through holes formed in lugs 91 on the brackets, the end of the rod and its corresponding lug being screw-threaded. A closed coil-spring 92 is carried by the rod and presses against the inner lug on each bracket and tends to separate the brackets. By turning the rod 89 to the right the brackets 87 will be drawn toward each other by the clamping action of the adjusting-rod. By turning it in the opposite direction the brackets will be relieved of the clamping action of the rod and the spring 92 will force them away from each other. When, therefore, it is desired to remove the jack-box from its normal position in the machine, the latches 84 are swung out from behind the jack-box, and by the handles 93 it is drawn outwardly, the studs 85 sliding in the grooves 86 until they enter the apertures 88. The jack-box will then be entirely outside of the machine and may be swung on the pivots formed by the studs 85, as indicated in Fig. 4. By tightening the rod 89 the brackets 87 will be drawn together and will engage and firmly clamp the jack-box, which may thus be adjusted and held at any desired angle.

A centering-finger 94 is pivoted to each side frame of the machine in the groove 83. The ends of these fingers nearest the pin-box are pressed inwardly by the springs 95 into the path of the pin-box. The opposite end of each of the fingers is provided with a card-engaging shoulder which is exactly in line with the cards as they are fed into operative position in front of the jack-box. When the pin-box is moved toward the jack-box, the inwardly-pressed ends of the fingers 94 will be engaged by the ends of the pin-box and pressed back toward the frame of the machine, thus swinging the shouldered ends inwardly, so that as the pressure-plate 64 is about to engage with the card the distance between the inner sides of the shoulders on the fingers will exactly equal the length of the card. If therefore a card has been fed either to one side or the other of the correct position, it will be moved longitudinally by the finger into the path of which it may project until the opposite end of the card contacts with the opposite finger, when the perforations on the card will register exactly with the proper openings in the pressure-plate, in which position it is then engaged and held securely by the pressure-plate during the operation of the circuit-closing or selecting devices.

Secured to one of the side frames of the machine and insulated therefrom is the contact-bar 96, provided with an adjustable contact-screw, with which the spring-tongue 97 is normally in contact. A bell-crank 98 is pivoted to the frame of the machine, and an insulated stud or roller 99, carried by one of its arms, normally rests on the spring-tongue 97. A stud or roller 100 on the end of the other arm of the bell-crank lies in the path of the cam 101 on the gear 61, and as the cam is revolved it will engage with the stud 100, lifting that end of the bell-crank, depressing the opposite end, and breaking the contact between the tongue 97 and contact-screw on the bar 96. As soon as the cam has passed the stud 100 the tongue 97 will reëstablish the contact with the screw.

The gears 61 are carried by the operating-shaft 105 of the machine, and the gears 19, 30, 42, and 70 are of the same size as the gear 61, so that when said shaft is thrown into operative connection with the motor by which the machine is operated one revolution of the operating-shaft will produce one reciprocation of the pin-box and one reciprocation of the card feeding and supporting devices. The operating-motor (which may be of any character) is connected with the power-shaft 106, carrying the pinion 107, which meshes with the gear 108, splined to the shaft 105. One of the gears 61 and the gear 108 are provided with shoulders 109, which are adapted to interlock and form a clutch between the two gears when they are brought together. This engagement is effected by means of the clutch-lever 110, which is formed with a yoke 111, which enters a groove in the hub of the gear 108. At its opposite end the lever 110 is pivotally supported by a lug 112, formed on the frame of the machine, and an adjustable tension-spring 113 normally holds the gears 61 and 108 apart, so that the shoulders 109 will not engage with each other when the gear 108 is revolved. An electromagnet 114 is supported on the frame of the machine and its armature 115 is carried by the clutch-lever 110. When the coils of the magnet 114 are energized, the armature 115 will be attracted by the magnet and the lever 110 will be drawn inwardly, sliding the gear 108 toward the gear 61. The shoulders 109 will thus engage, and the motion of the gear 108 will be transmitted to the gear 61 and to the other actuating-gears of the machine, the operation of which will thus be commenced and continued until the armature 115 is released by the breaking of the circuit through the coils of the magnet 114, when the spring 113 will actuate the lever 110 to disconnect the gears 61 and 108, and the machine will stop. A handle 116 is formed on the clutch-lever 110, by which the starting of the machine may be assisted manually in case of sluggish action of the magnet 114.

Referring now to the diagram, Fig. 5, of the electrical circuits, the contact-tongue 75 is connected with the generator 120 by the conductor 121. For simplicity only one group of conductive pins 62 and jacks 80 is shown in this diagram, the connection of which with the terminal 75 is controlled by the contact actuating-pin 76, as previously described. The conductive pin 122 is in electrical connection with the pins 62. Each of the spring-jacks 80 is connected with the magnet of one of the registering devices or counters 81 by the conductors 123. A conductor 124, which includes the coils of the starting-magnet 114, connects all the counters with the generator. The pin 122, which controls the operation of the sorting apparatus, coöperates with the jack 125, which is connected with the line by a conductor 126, which includes the coils of the sorting-magnet 58. This magnet controls the position of the deflector 52. When its coils are inactive, the bell-crank 56 will hold the deflector 52 in position to deliver the cards into the chute 53. When a circuit is completed through the coils, the bell-crank 56 will be released and swing the deflector into the position shown in the dotted lines, Fig. 3, and the card will be delivered into the chute 54. These circuits are, as will be readily understood, open at all times except when one of the conductive pins is in contact with one of the jacks and are therefore directly controlled by the record, and I have hereinafter employed the term "record-controlled" to designate one or both of these circuits. The contact between the pins and jacks in the regular operation of the machine exists only during a fractional part of one revolution, and as the specific form of machine which I have been describing is intended for continuous electrical operation it is necessary to provide an independent circuit by which the circuit through the clutch-magnet 114 shall be closed during the remainder of the revolution. This circuit, which I have termed the "starting-circuit," comprises the conductor 127, connecting the contact-bar 96 with the conductor 121, and the conductor 128, connecting the spring contact-tongue 97 with the conductor 124. This circuit is normally closed; but once in each revolution of the machine the cam 101 will engage the stud 100 and actuate the bell-crank 98 to momentarily break the contact between the tongue 97 and the bar 96, as previously explained, and the operative parts of the machine are so arranged that this will occur when the circuit is completed through the pin-box. Thus I provide not only for the continuous rotation of the machine, but at this particular period of its operation the control of the machine is transferred entirely to the circuit-closing devices controlled by the record, so that unless the circuit is completed through them, which will not occur unless a properly-punched card is in proper position in the machine, the clutch-magnet 114 will be deënergized, releasing the clutch 110, and the machine will stop. Suitable resistances R are arranged in the circuits to properly balance them.

In making a more extensive subdivision of the cards (which, of course, may be done independently of the compilation) by sorting them into more than two classes I may employ an additional deflector for each additional sorting-compartment or I may employ one variably-operated guide or deflector for all the compartments. In Figs. 7 to 10 I have shown a plurality of deflectors. These are operated by magnets controlled by pins in the pin-box, and an additional pin, jack, and magnet are employed for each additional deflector. The principle of operation is the same whether two or a greater number of compartments and whether one or a plurality of deflectors be employed; but in Figs. 7 to 10 I illustrate a modified arrangement of electrical operating means, which I will now describe. The deflectors 150 to 159 are mounted below the ejector-rolls 45 46 on rock-shafts 160, which are arranged at the top of chutes leading to the compartments 161 to 171 of the sorting-box. Each rock-shaft is provided with a depending arm 172. Five of these are on one side of the machine and five are on the other side, arranged alternately. A series of electromagnets 173 to 182 are arranged below these arms. The armature of each of these magnets engages and latches one of the arms 172 in the position shown in Figs. 8 and 10. In this position all cards delivered from the machine will pass into the compartment 161. Referring to Fig. 7, each of the magnets 173 to 182 is in a separate circuit and each of these circuits is controlled by one of the relays 185 to 194. Each relay is connected with one of the jacks in the frame 79 and through a suitable resistance R with the generator. The pins which coöperate with the jacks to actuate the relays are adapted to be connected with the generator by conductor 121, as previously described, when the pin-box 63 is operated. The delivery of the card into its proper compartment is determined by punching a hole therein, which when the card is in position will be opposite the jack which is connected with the proper relay. If the record on the card denotes, among other things, that the card should be delivered into the compartment 164, a hole is punched in the card opposite the jack connected with relay 187. When the pin contacts with this jack, the circuit will be closed and established through the relay 187, which is connected with the generator by the conductor 195. The relay-magnet will attract its armature, closing the relay-contacts and establishing a circuit, which, starting from the generator, includes conductors 121 and 196, the coils of magnets 173, 174, and 175, the contacts of relay 187, the conductor 197, the resistance R. The closing of the circuit through the coils of the magnets 173, 174, and 175 will cause these magnets to attract their armatures and release the arms 172, connected with the deflectors 150 151 152. Torsion-springs 198 on the shafts 160 will cause these three deflectors to swing to the right, Fig. 10, past the ejector-rolls, establishing communication with the receptacle 164, into which the card delivered by the machine will fall by gravity. On each side of the machine is a reciprocating bar 200. These bars are each supported at one end on a guide 201 and at the other by the shaft of the sprocket-wheel 202. A spring 203 holds a stud 204, carried by each bar, in contact with a cam 205 on the sprocket. The sprocket 202 is driven by the sprocket 206, with which it is connected by the chain 207. The sprocket 206 is carried by the shaft 105. At each revolution of the sprocket 202 the bar 200 under action of the spring 203 and cam 205 is moved back and forth to and from the full-line to the dotted-line position shown in Fig. 10. The machine is so timed that just before the arms 172 are tripped by the magnets the studs 208 will have been moved out of engagement with the arms, so as to permit the deflectors to reach their limit of movement to the right, Fig. 10, when the bar 200 is retracted to the dotted-line position. After the card has been delivered into the proper compartment and after the relay-circuit has been broken through its pin and jack and the sorting-magnets have been deënergized the revolution of the cam 202 will advance the bar 200 and the studs 208 will carry the arms 172 forward into engagement with the armatures, where they will be relatched. The deflectors will thus be all returned to their normal position and all cards not properly punched for delivery into one of the receptacles 162 to 171 or to close the circuit through the pin-box will fall into the receptacle 161.

Referring to the sorting mechanism, I have for convenience of description referred to the device employed for establishing communication with the proper compartment as a "deflector." It is not necessary to the operation of my invention that the cards should be actually deflected into the proper compartments, and I do not intend to limit any of my claims to a structure in which the part 52 or its equivalent actually engages with or deflects the cards.

In the diagram Fig. 6 I have illustrated more in detail one of the many possible ways of connecting the pins, jacks, and counters. In this diagram I have indicated a card 7 in position in front of the jacks. Certain of the pins are in contact with the jacks, having passed through the holes in the card. The other pins are held back out of contact with the jacks. I have also shown two pins 209 and jacks 210, which are located just outside of the margin of the card when it is in proper position before the jacks. Any practicable number of these pins may be employed, and they are so located that if a card is not fed into proper operative position the card will project over the pins, hold the pins back, and prevent them from making contact. As these pins are connected in series in the record-controlled circuit, such failure to establish contact will prevent any action of the devices in circuit with them and stop the machinery by releasing the clutch-lever 110. The pins 62 and their jacks 80 are arranged in groups, of which three are shown. Groups A and B each represent a different series of statistical items according to the scheme of compilation. The jacks are also arranged in subgroups according to the scheme of counting. For instance, the first, second, and fifth jacks of group A control separate counters, while the third and fourth jacks are provided with a counter common to both, and the second, third, fourth, and fifth jacks are provided with a total-counter, which will totalize their registration. The connection of the other counters will be readily understood from the diagram in view of the above explanation. Group C comprises the pins and jacks which control the sorting apparatus. (Shown diagrammatically in Fig. 16.) The diagram Fig. 6 illustrates another of the many possible ways of connecting and operating the sorting apparatus. As shown in this diagram and in Fig. 16, the apparatus comprises a receiver 211, containing four compartments. Three deflectors 212 to 214 are arranged to control communication with these compartments. The deflectors are held in position by latches controlled by electromagnets. When the magnets are energized to release the latches, springs actuate the released deflectors to establish communication with the proper compartment, and after the record has been delivered resetting mechanism returns the deflectors to their normal position, where they are engaged and held by the latches. The deflectors are operated substantially as shown in Fig. 10, except that the deflector-magnets 215, 216, and 217 are connected in series with each other in the circuit established through the pin-box instead of being controlled by relays, so that if the circuit is not properly closed through the pin-box, owing to an improperly punched or located card, none of the deflectors will be actuated and all such defective cards will fall into the left-hand compartment of the receiver 211. If, however, the card be properly punched to effect the closing of the circuit through one of the pins of group C, one or more of the magnets will be energized, depending upon which pin is included in the circuit, and a corresponding number of deflectors will be operated to deliver the record to the predetermined compartment.

The operation of the machine is as follows: The cards 7, having been punched, are placed upon the platform 6, and the follower-plate 14 is placed behind them. The switch is then operated to close the circuit through the conductors 121 and 127, contacts 96 and 97, conductor 128, clutch-magnet 114, and conductor 124. This locks the gear 61 with the gear 108 and starts the machine. The cross-head 12 descends, and the blade 13 will engage with the upper edges of the first card on the platform and will carry it down until it is grasped by the rotating rolls 20 and 21, which will feed the card downward until it rests on the supporting-fingers 37 and 44. In the meantime the pin-box has been reciprocated toward the jack-frame, and as soon as the card has been adjusted longitudinally by the centering-fingers 94 the yielding pressure-plate 64 will engage with the card and hold it firmly against the plate 78. As the pin-box advances the pins 62 will be projected through the holes in the pressure-plate and will contact with the card where there are no holes punched. Such of the pins as are opposite holes in the card will, however, enter them and contact with the jaws of their spring-jacks. As this occurs the pin 76 will contact with the card and will be held back as the pin-box advances, contacting with the tongue 75 and closing the record-controlled circuit through conductor 121, contact 75, pins, jacks, and counters, conductor 124, and clutch-magnet 114. As soon as this circuit is established the cam 101 will actuate the bell-crank 98 and break the starting-circuit momentarily. Referring to the diagram Fig. 6 and assuming that the card now in position has been punched, as indicated in Fig. 11, in which the first circle in group A, the third in group B, and the third in group C have been punched, the circuits will be established as follows: from the contact 75 to the conductor 73, through the pins 209 and jacks 210 to the pins of group A, by the first pin of that group to the jack, through the magnet-coils of the left-hand counter connected therewith to the right-hand counter of group B, to the third jack and the pin in contact therewith, to the conductor connecting all the pins of the group, thence to the conductor common to all the pins of group C, thence by the third pin to the third jack, and through the coils of the sorting-magnets 215, 216, and 217, releasing all three of the deflectors 212, 213, and 214, which will swing to the left and establish communication with the right-hand compartment of the receiver 211. From the sorting-magnets the circuit will be completed by conductor 124 to the clutch-magnet coils and thence to the generator. From this diagram and description it will be readily seen that if the card is not in position to engage the pin 76 or is not in position to escape the pins 209 or if no hole is punched in any group the circuit will not be completed through the pin-box, and when the starting-circuit is broken between the contacts 96 and 97 the machine will stop. After the circuit has been established as above the pin-box is drawn back from the jacks, and as soon as the pressure-plate 64 is carried out of contact with the card the rolls 27 are swung toward the rolls 26, engaging the ends of the card. At the same time the supporting-fingers 37 will be drawn from under the card, which will be fed between the ejector-rolls 45 and 46 and delivered into the proper sorting-compartment, and the deflectors will be reset, as before described. If, however, the circuit is not completed, owing to a defective card, none of the deflectors will be operated and the card will be delivered into the compartment for rejected cards. Another card will in the meantime have been fed into position and the operation above described will be repeated continuously until the machine is stopped, as above described, by the improper registration or punching of a card or by the exhaustion of the supply on the feeding-platform.

I have said that electrical operation is not essential to many of the features of my invention. For instance, the sorting apparatus may be operated mechanically, if desired, and in Figs. 12 and 13 of the drawings I show a modified structure embodying such a mechanically-operated sorting apparatus. This consists of the side frames 220, which support the card-platform 221. The follower-plate 222 under the action of the springs 223 holds the cards 7 firmly against the slotted plate 224, in which the cross-head 225 reciprocates. The cross-head is provided with projecting lips 226, which engage with the upper edges of the cards, and is reciprocated by the crank 227, with which it is connected by the connecting-rod 228 and lever 229. Between the card-platform 221 and the plate 224 is a slot 230, through which the cards are fed by the cross-head. Below this slot is a perforated plate 231, at the bottom of which is the card-support 232. The pin-box 233 carries a number of spring-pressed pins 234, arranged to enter the perforations in the plate 231. Behind the plate 231 is a series of pivoted fingers 235, one for each of the sorting-compartments. When the pin-box is reciprocated by means of the connecting-rods 236, which are connected with the crank-shaft 237 by a suitable eccentric, the pins will, if no card is in position, enter their respective holes in the plate 231 and engaging with the fingers 235 will press them away from the plate. The fingers 235 are extended downwardly below their fulcrums 238, forming levers, each of which is connected with a hinged deflector 239. Each deflector consists of two pairs of pivoted links, one pair being arranged near each end of the card. If a card be punched for delivery into one of the compartments 240, when the card is in position and the pin-box is reciprocated the proper pin will pass through the hole in the card and swing the finger which controls the deflector communicating with that compartment outwardly, where it will be engaged by the latch 241. This will swing the deflector in toward the sorting-compartment and will establish communication therewith. When the support 232, which is connected with the shaft 237 by the connecting-rod 242, is swung downwardly by the rotation of the shaft, the card will be released and will fall into the proper compartment. After this occurs the rotation of the shaft 237 will carry the rod 243 into engagement with the latch 241, lifting it and releasing the finger, which will return to its original position under the action of the spring 244.

In Figs. 14 and 15 of the drawings I illustrate a modified form of apparatus in which the cards are supported and fed to the circuit-closing devices horizontally instead of vertically. The cards 7 are supported on the platform 250 and are fed into position under the pins by the horizontally-reciprocating cross-head 251, to which a plate 252 is secured. This plate is provided with a projecting edge which engages the under card in the pile. The cross-head is by the connecting-rods 253 connected with the cranks 254, secured to the shaft 255, upon which the driving-pulley 256 is mounted. This pulley receives power from any suitable source. The pin-box 257 is supported by two pairs of links 258, which are at one end pivoted to the upright 259, secured to the frame of the machine, and at the opposite end are pivotally secured to the pin-box. One pair of the links 258 is connected with the lever 260, and the lower end of this lever is connected with an eccentric on the shaft 255 by the connecting-rod 261. The parts are so arranged that when the shaft 255 is rotated the cross-head 251 will be reciprocated to feed a card into position under the pins, and then the lever 260 will be swung outwardly to depress the pin-box. In this form of apparatus I have dispensed with the spring-jacks and have substituted for them a series of mercury-cups, one for each pin. The pins are electrically connected with the line by a common conductor, and each of the cups is separately connected with one of the registering devices 81. In Fig. 14 I also illustrate a modified form of device for preventing any registration in case no card is in the machine. This consists of a conductive pin 262, which is longer than the other pins in the box, and its mercury-cup is connected with the coils of the relay-magnet 263. The record-controlled circuit includes and is controlled by the armature of this relay. The pin 262 is so located in the pin-box that the pin always comes in contact with an unpunched portion of a properly-located card, so that if a card is in proper position in the machine the pin will be held back and no circuit will be established through the coils of the relay 263. Then when the shorter pins contact with the mercury in their cups the circuit will be closed through the counters 81 and the armature of the relay. If, however, no card be in the machine, the pin 262 will enter its cup and close the circuit through the relay-coils before the counter-circuit is completed through the shorter pins, and the energizing of the relay-coils will attract the armature, breaking the counter-circuit, and the counters will therefore not be operated.

It will be understood that many other modifications may be made in the form, construction, and arrangement of the apparatus herein described. Different methods of arranging the electrical circuits may also be substituted for those which I have shown herein, and the method of arranging the circuits and connecting the machines will be varied to agree with the scheme of compilation and the character of the data. For instance, the records may be formed in a continuous strip and presented successively to the operation of the compiling or sorting devices, and then each record may be severed from the strip by appropriate mechanism and delivered into its proper compartment.

I have before stated that the registering apparatus described and claimed in my pending application, Serial No. 34,019, may be employed instead of the electromechanical counters which I have described as applicable for the counting of units. In case such apparatus be substituted for the counters it will be necessary to connect the two machines, so that they will operate in exact synchronism. For instance, the shaft 106 shown in the accompanying drawings may be the same shaft as the shaft 42 in the machine illustrated in my said pending application, the only requirement being that the gear 74 of said machine should rotate with the gear 108 of the machine therein described. It will also be understood that two or more of the machines herein described may be connected to operate consecutively in connection with the machines just referred to. In that case, however, it will be necessary to adjust the gears of each machine so that their regular and periodic consecutive action will be insured.

Having thus described my invention, what I claim as new, and desire to secure by Letters Patent, is—

1. The combination with a plurality of record-controlled registering-counters, of means for supporting a plurality of the counter-controlling records, means for moving the records singly into position to control the operation of the counters, a plurality of sorting-compartments and means controlled by the records for delivering each one to its proper compartment.

2. The combination with a plurality of record-controlled registering-counters, means for feeding the counter-controlling records singly into position to control the operation of the counters, a plurality of sorting-compartments and means controlled by the records for delivering each one to its proper compartment after the control of the counters thereby has been effected.

3. In apparatus of the character described the combination of a plurality of record-cards, a support for said cards, means for removing them from said support singly and feeding them one by one into operative position, a plurality of sorting-compartments and means controlled by the record-cards for delivering a card to its proper sorting-compartment at each operation of the machine.

4. In apparatus of the character described the combination of a support for a plurality of record-cards, means for successively removing the cards from said support and feeding them singly into operative position, a plurality of sorting-compartments, means for feeding the record-cards into said compartments and selecting means controlled by the record-cards for determining the compartment into which each record shall be delivered.

5. In apparatus of the character described the combination with registering devices, of a plurality of cards each containing a record adapted to control the operation of registering devices, a support for said cards, means for feeding them singly into a position in which they may control the operation of the registering devices, a plurality of sorting-compartments and means controlled by the record-cards while in said position to deliver one card into its proper sorting-compartment at each operation of the machine.

6. In apparatus of the character described the combination of a support for a plurality of record-cards, means for feeding the cards into operative position, a plurality of sorting-compartments, means controllable by the records for delivering a record-card to its proper compartment at each operation of the machine and means controlled by the record-cards for actuating said feeding and delivering means.

7. In apparatus of the character described, the combination of means for feeding the records successively into operative position, means for supporting each record in such position, a plurality of sorting-compartments, means controlled by the record for obstructing the entrance to all but one of said compartments at each operation of the machine, and means controlled by the record for delivering it to the compartment to which the entrance is unobstructed.

8. In apparatus of the character described, the combination of a plurality of sorting-compartments, a plurality of deflectors controlling the entrance to such compartments, means for operating said deflectors to effect such control, record-controlled means for determining which of said deflectors shall be operated at each operation of the machine and means controlled by the record for returning said deflectors to their normal position.

9. In apparatus of the character described, the combination of a plurality of sorting-compartments, means for feeding the records to such compartments, electrically-operated devices for establishing communication with one only of such compartments at each operation of the machine, record-controlled circuit-closing means for determining the compartment with which such communication shall be established and means controlled by the record for delivering the record to such compartment.

10. In apparatus of the character described the combination of a support for a plurality of record-cards, means for feeding the cards edgewise into operative position, a plurality of sorting-compartments, and means controllable by the record-cards for delivering a record-card to its proper compartment at each operation of the machine.

11. In a continuously-operable machine of the character described the combination of a support for a plurality of records, means for engaging said records and feeding them successively to their operative position, means for supporting them in such position, a plurality of compartments for receiving the records, means for determining the compartment into which each record shall be delivered, means for delivering each record to its predetermined compartment and means controlled by the record for operating successively and coöperatively the feeding and delivering devices at each operation of the machine, substantially as set forth.

12. In apparatus of the character described, the combination of a plurality of record-receiving sorting-compartments a plurality of electromagnets each controlling the entrance to one of such compartments, circuit-controlling devices for each magnet, record-controlled means for governing the action of the circuit-controlling devices and determining which compartment shall receive the record and means also controlled by the record for delivering the same into such compartment.

13. In apparatus of the character described the combination of a plurality of sorting-compartments to receive the record-cards, means for delivering the cards into such compartments, means for determining the compartment which shall receive the card comprising selecting devices having two relatively movable members and means for feeding the record-cards singly between said members to control the operation of the selecting devices and the delivery of the cards.

14. In apparatus of the character described the combination of a plurality of sorting-compartments to receive the record-cards, means for delivering the cards singly into the compartments, circuit-closing devices by which the delivery of each record into its proper compartment is controlled, means for feeding compartment is controlled, means for feeding the record-cards between the terminals of the circuit-closing devices and means for actuating the latter to complete a circuit through a perforation or perforations forming the record on the card.

15. In apparatus for compiling statistics and the like from records, the combination of compiling apparatus, means controlled by the records for actuating the compiling apparatus, a support for a plurality of the records, devices for feeding the records from said support and presenting them singly to the action of the means by which the compiling apparatus is actuated and means for actuating successively and coöperatively the record-feeding devices and the compiling apparatus.

16. In apparatus for compiling statistics and the like from records, the combination of a support for a plurality of records, a plurality of registering devices, electromagnets controlling the operation of the registering devices, circuit-controlling devices controllable by the records and in circuit with the magnets, means for feeding the records from their support and presenting them singly to the circuit-controlling devices and means for actuating successively and coöperatively the record-feeding means and circuit-controlling devices.

17. In apparatus for compiling statistics and the like from records, the combination of a support for a plurality of records, a plurality of registering devices, circuit-controlling devices controllable by perforations in the records and in circuit with the magnets, means for feeding the records from their support and presenting them singly to the circuit-controlling devices and means for actuating successively and coöperatively the record-feeding means and circuit-controlling devices.

18. The combination of a support for a plurality of records, means for feeding the records singly into operative position, registering devices, electromagnets controlling the operation thereof, circuit-closing devices in circuit with the magnets, means for actuating the circuit-closing devices by perforations in the records, means for operating successively and coöperatively the record-feeding and circuit-closing devices and means for removing the records from their operative position independent of the feeding devices.

19. In apparatus of the character described the combination of compiling apparatus, record-controlled means for actuating said apparatus, means for supporting a plurality of the records, devices for feeding the records and presenting them singly in operative position, means also controlled by the record for actuating successively and coöperatively the record-feeding devices and compiling apparatus.

20. In a continuously-operable, record-controlled apparatus for compiling records, the combination of a support for a plurality of records, means for engaging said records and feeding them successively to their controlling position, means for supporting them singly in such position, registering devices for compiling the data on the records, means for operating the registering devices in accordance with each record, means for removing each record from its controlling position and means controlled by the record for effecting successively and coöperatively the feeding, the compilation and the removal of the record, substantially as set forth.

21. In a continuously-operable, record-controlled apparatus for compiling and sorting records, the combination of a support for a plurality of the records, means for engaging said records and feeding them successively to their controlling position, means for supporting them in such position, registering devices for compiling the data on the records, means for operating the registering devices in accordance with each record, a plurality of compartments for receiving the records, means for determining the compartment into which each record shall be delivered, means for delivering each record to its predetermined compartment and means for operating successively and coöperatively the feeding, compiling and delivering devices at each operation of the machine, substantially as set forth.

22. In apparatus of the character described, the combination of a support for a plurality of cards, a feed-slot, a reciprocating card-engaging device for carrying the card through the feed-slot, feed-rolls for engaging the card below the slot, a movable support for receiving the card when it is in operative position and ejector-rolls below said support for engaging the card after said support has been withdrawn, substantially as shown and described.

23. In apparatus of the character described, the combination of a support for a plurality of cards, a feed-slot, a reciprocating card-engaging device, for carrying the card through the feed-slot, feed-rolls for engaging the card below the slot, a movable support for receiving the card when it is in operative position, ejector-rolls below said support for engaging the card after said support has been withdrawn and rolls intermediate the feed and ejector rolls for carrying the card from its operative position to the ejector-rolls, substantially as shown and described.

24. In apparatus of the character described, the combination of reciprocating selecting devices arranged to coöperate with a record-card and means actuated when said devices are reciprocated to secure correct registration of the card with the selecting devices, substantially as shown and described.

25. In apparatus of the character described, the combination of record-controlled selecting devices, means for feeding the record, means for arresting the movement of the record at a predetermined point and centering devices actuated by the movement of the selecting devices for moving the record across its feeding direction, to secure correct registration of the record with the devices controlled by it, substantially as shown and described.

26. In apparatus of the character described, the combination with a reciprocating frame carrying record-controlled mechanism, of movable centering-fingers arranged in the path of said frame and actuated thereby for securing the registration of the record with the mechanism controlled thereby.

27. In apparatus of the character described, the combination of record feeding and delivering mechanism, a motor, devices for connecting said mechanisms and the motor, means for maintaining such connection independent of the record, means controlled by the record for maintaining such connection and means for transferring the control of such connection to the record while the record is in operative position, substantially as shown and described.

28. In apparatus of the character described, the combination of record feeding and delivering devices, circuit-closing devices controlled by the record, a motor, releasable connections between the motor and the feeding and delivering devices, a magnet controlling such connections, a circuit controlled by the record, a circuit controlled independently of the record and means for transferring the control of the magnet from the independently-controlled to the record-controlled circuit when the latter is established.

29. In apparatus of the character described, the combination of record-controlled contacts, mechanism for feeding records successively thereto, a motor, electrically-operated connections between the feeding mechanism and the motor, record-controlled contacts for maintaining the connections between the motor and the feeding mechanism, contacts controlled by the motor for maintaining such connections independently of the record-controlled contacts and means for actuating the motor-controlled contacts to release their control of said connections when the latter are under the control of the record-controlled contacts.

30. In apparatus of the character described, the combination of electrically-operated compiling apparatus, mechanism for feeding the records singly thereto, a motor, electrically-operated connections between the feeding mechanism and the motor, contacts controlled by the records for actuating the compiling apparatus and maintaining the connections between the motor and the feeding mechanism, contacts controlled by the motor for maintaining such connections independently of the compiling-apparatus contacts, and means for actuating the motor-controlled contacts to release their control of said connections when the compiling apparatus is operated.

31. In apparatus of the character described, the combination of electrically-operated compiling apparatus, mechanism for feeding the records singly thereto, a motor, electrically-operated connections between the feeding mechanism and the motor, contacts controlled by the record for actuating the compiling apparatus and maintaining such connections, contacts controlled by the motor for maintaining such connections independently of the compiling-apparatus contacts, means for actuating the motor-controlled contacts to release their control of said connections when the compiling apparatus is operated, and means for reëstablishing the control of the motor-controlled contacts.

32. In apparatus of the character described, the combination of a reciprocating frame, record-controlled contacts carried thereby and a yielding pressure-plate carried in advance of said frame for engaging the record, substantially as shown and described.

33. In apparatus of the character described, the combination of a reciprocating frame, record-controlled pins carried by said frame and a record-engaging plate provided with apertures for said pins and yieldingly supported in advance of the pins, substantially as shown and described.

34. In apparatus of the character described, the combination of a reciprocating frame, record-controlled pins carried by said frame, a record-engaging plate carried by said frame and provided with apertures for the pins and means for yieldingly supporting said plate in advance of the frame.

35. In apparatus of the character described, the combination with an electric circuit of a plurality of conductive pins, a contact device by which the pins are connected to the circuit and means controlled by the records for actuating said contact device, substantially as shown and described.

36. In apparatus of the character described, the combination with an electric circuit of a frame carrying a plurality of conductive pins normally disconnected from the circuit, a contact carried by said frame and means controlled by the records for actuating said contact to connect the pins to the circuit, substantially as shown and described.

37. In apparatus of the character described, the combination with an electric circuit of a frame carrying a plurality of conductive pins normally disconnected from the circuit, a contact carried by said frame, and a spring-pin carried by the frame and arranged to engage with the record and connect the conductive pins with the circuit, substantially as shown and described.

HERMAN HOLLERITH.

Witnesses:
JOSIAH C. STODDARD,
FRANCES PEYTON SMITH.